(12) United States Patent
Morin et al.

(10) Patent No.: US 7,997,022 B2
(45) Date of Patent: Aug. 16, 2011

(54) METHOD AND APPARATUS FOR COLLIMATING AND COALIGNING OPTICAL COMPONENTS

(75) Inventors: Steven E. Morin, Nottingham, NH (US); Brian W. Cranton, Sanbornton, NH (US)

(73) Assignee: L-3 Insight Technology Incorporated, Londonderry, NH (US)

( * ) Notice: Subject to any disclaimer, the term of this patent is extended or adjusted under 35 U.S.C. 154(b) by 501 days.

(21) Appl. No.: 11/958,901

(22) Filed: Dec. 18, 2007

(65) Prior Publication Data

US 2009/0223072 A1    Sep. 10, 2009

Related U.S. Application Data

(60) Provisional application No. 60/870,459, filed on Dec. 18, 2006.

(51) Int. Cl.
*F41G 1/00*    (2006.01)
(52) U.S. Cl. .................... 42/114; 42/120; 359/15
(58) Field of Classification Search ............ 42/114–117, 42/120
See application file for complete search history.

(56) References Cited

U.S. PATENT DOCUMENTS

| | | | | |
|---|---|---|---|---|
| 3,464,770 A * | 9/1969 | Schmidt | ...................... | 356/4.01 |
| 3,533,696 A * | 10/1970 | De Winter | ................... | 356/5.06 |
| 4,334,300 A * | 6/1982 | Arquie et al. | ............. | 369/44.12 |
| 4,385,834 A * | 5/1983 | Maxwell, Jr. | ................. | 356/153 |
| 5,141,313 A * | 8/1992 | Brun | .......................... | 356/251 |
| 6,211,951 B1 * | 4/2001 | Guch, Jr. | ................... | 356/152.1 |
| 6,552,853 B2 * | 4/2003 | Goodman | .................... | 359/627 |
| 7,142,357 B2 * | 11/2006 | Greenslade | ................. | 359/353 |
| 7,269,920 B2 * | 9/2007 | Staley, III | ..................... | 42/114 |
| 2002/0145102 A1 * | 10/2002 | Eckelkamp-Baker et al. | ......................... | 250/203.1 |
| 2005/0001168 A1 * | 1/2005 | Amon et al. | ................. | 250/353 |
| 2005/0252062 A1 * | 11/2005 | Scrogin et al. | ................. | 42/119 |
| 2006/0098258 A1 * | 5/2006 | Chen | ............................ | 359/15 |
| 2008/0000133 A1 * | 1/2008 | Solinsky et al. | .............. | 42/115 |
| 2009/0051989 A1 * | 2/2009 | Dobschal et al. | ............. | 359/15 |
| 2009/0100735 A1 * | 4/2009 | Schick et al. | .................. | 42/123 |
| 2010/0058640 A1 * | 3/2010 | Moore et al. | ................... | 42/114 |

* cited by examiner

*Primary Examiner* — Michael Carone
*Assistant Examiner* — Samir Abdosh

(57) ABSTRACT

A laser alignment assembly has two or more lasers aligned relative to one or more reflective surfaces to generate coaligned and collimated light beams. The assembly may further make the light beams collinear. The orientation of the reflective surface may be controlled by an electrically controllable actuator. The laser alignment assembly may be disposed in a weapon aiming system having visible and infrared lasers and may be coupled to a weapon to aid in aiming of the weapon.

18 Claims, 16 Drawing Sheets

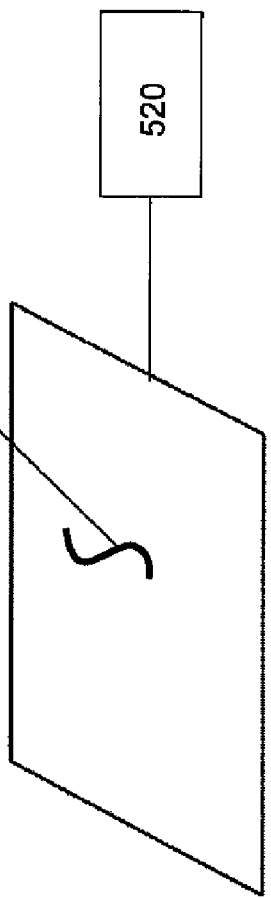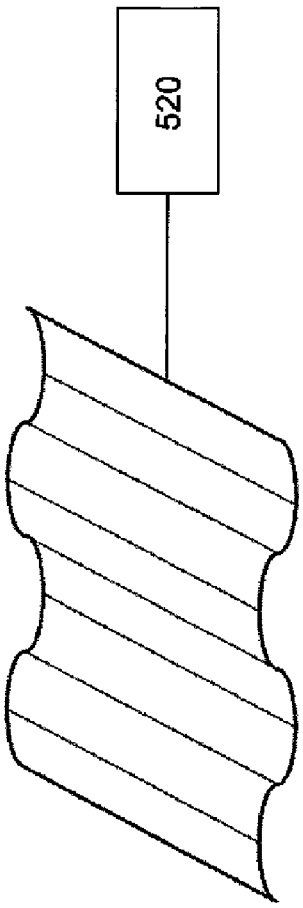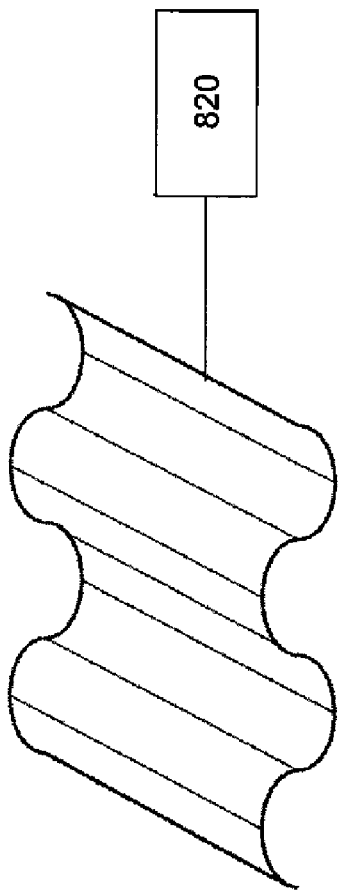

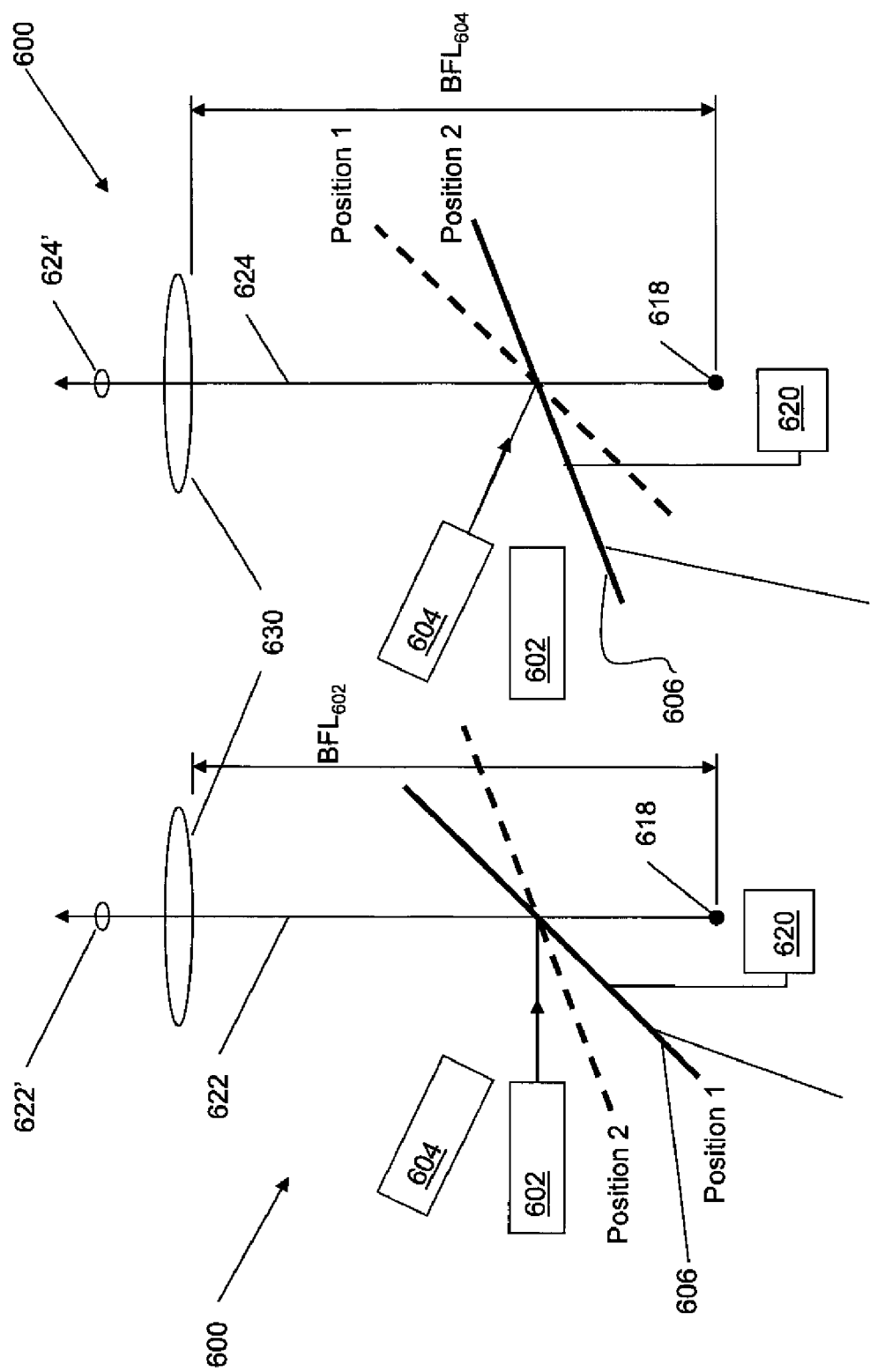

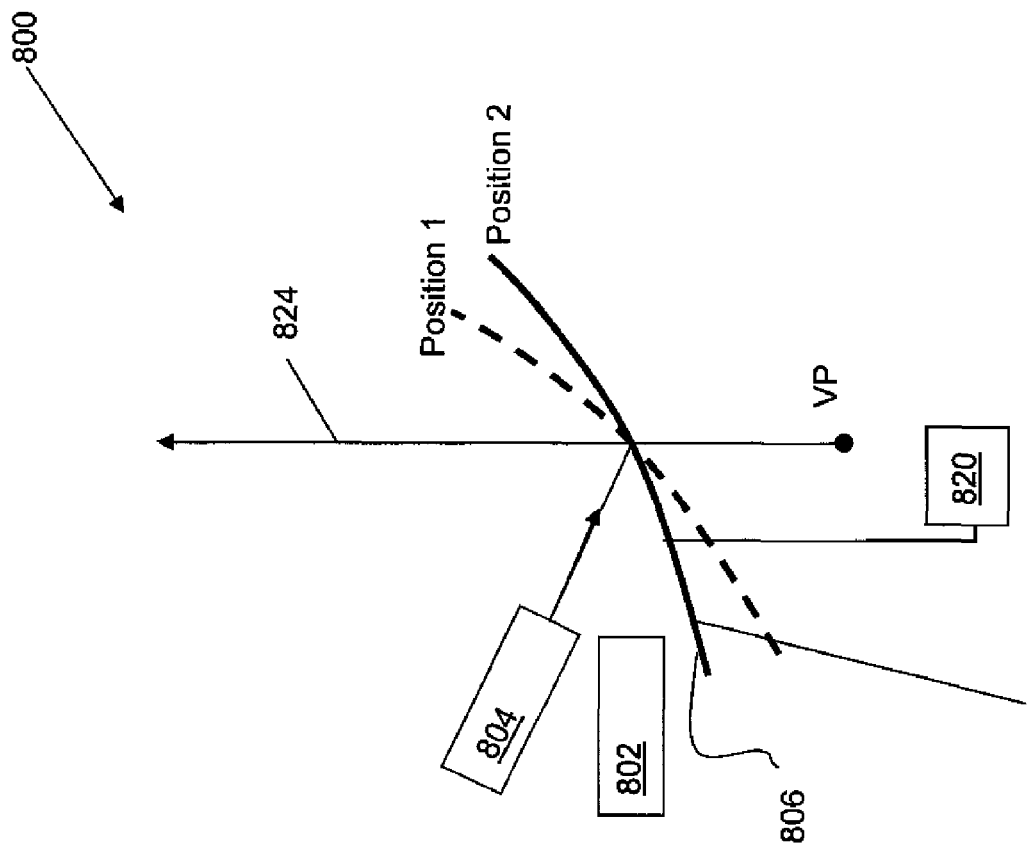
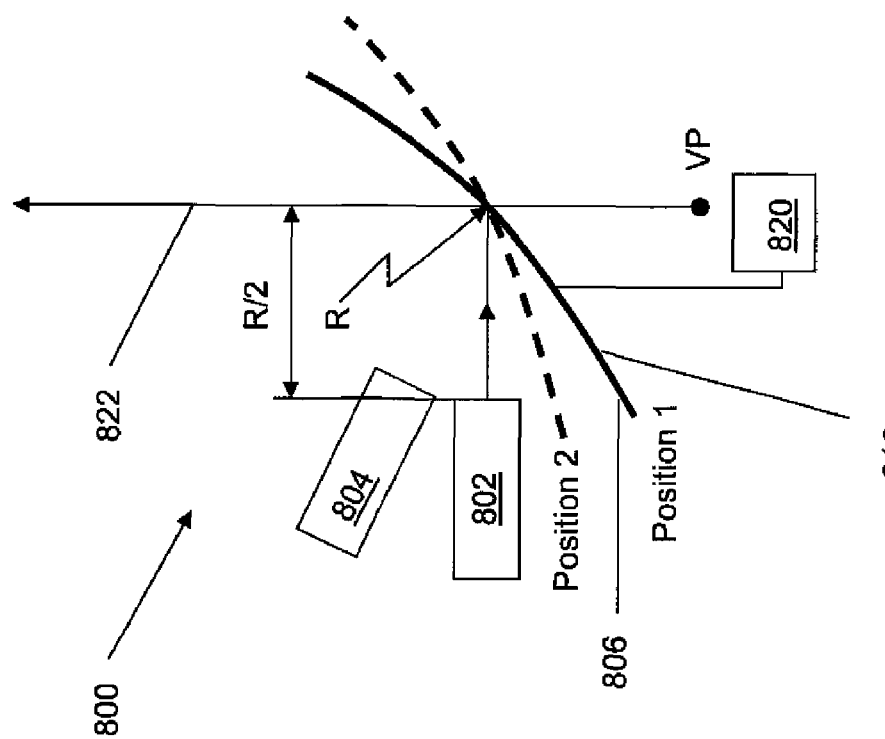

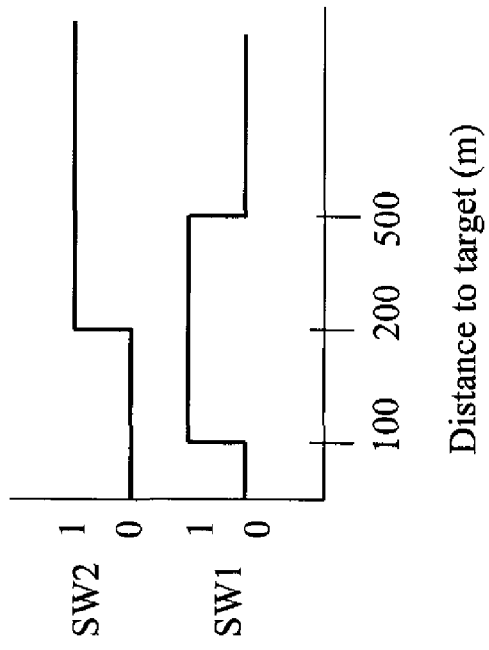
Figure 9C
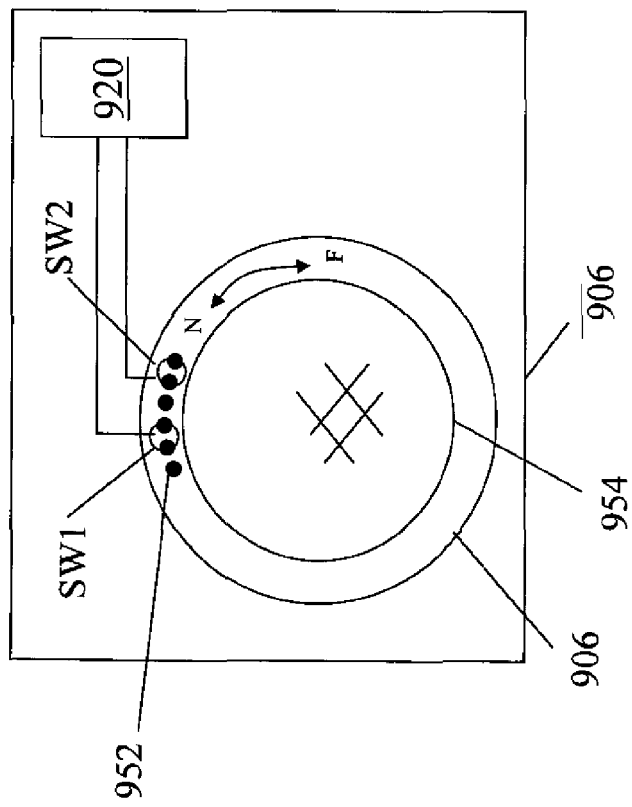
Figure 9B
| Distance to target (m) | SW1 | SW2 | Illum. Spot Size | Dot shift |
|---|---|---|---|---|
| 0-100 | 0 | 0 | X-Large | |
| 100-200 | 1 | 0 | Large | +B |
| 200-500 | 1 | 1 | Medium | 0 |
| 500+ | 0 | 1 | Small | -C |
FIG. 9D

METHOD AND APPARATUS FOR COLLIMATING AND COALIGNING OPTICAL COMPONENTS

CROSS-REFERENCE TO RELATED APPLICATIONS

This application claims the benefit of U.S. provisional patent application Ser. No. 60/870,459 filed Dec. 18, 2006. The entire disclosure of which is incorporated herein by reference in its entirety.

BACKGROUND OF THE INVENTION

Soldiers are required to rapidly acquire, identify, and accurately fire on enemy targets using devices that generate collimated and diverging visible and invisible light beams generated by one or more light sources (e.g. LED, laser, or filament). These devices may be carried by hand, tripod mounted, or mounted on small arms such as the M4A1 carbine and other weapons and are used to provide better target observation, illumination, identification, location, and marking. These devices may further include optical sensors and/or imaging optics to enhance the operation of the device with range finding and observation functionality. Unlike visible light sources, infrared light sources are only viewable with a night vision device, a phosphorescence material, thermal imager, or other device of similar function. Collimated beams of light, diverging beams of light, optical sensors, and/or imaging optics may be focused. Coalignment of the visible light source with the invisible light sources, the optical sensor, and the imaging optics allows a soldier to boresight those components using just the visible light source (i.e. without the need for a night vision device to see the invisible light beams) and coalignment of other components, such as an aim laser to a range finder so a soldier knows what is being ranged. This may enable a user to boresight the previously coaligned components to some reference, such as a point of impact of a projectile at a known distance or a barrel mounted boresight laser.

A device housing may provide protection to internal components from unintended contact or debris. An optical bench located within the device housing may be used to hold the electrical and optical components of a coaligned subsystem. Mechanical adjustors extending through the housing and in contact with the optical bench may be used to steer the optical axis of the coaligned components relative to the housing. The housing may be coupled to a weapon with a suitable attachment mechanism, for example a rail grabber, slide-lock® mechanism, or other clamp.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 5C-5E is a schematic depiction of a deformable reflective surface in different configurations useful in the laser alignment system of FIG. 5B.

FIGS. 6A and 6B are schematic depictions of a laser system consistent with an eighth embodiment of the invention.

FIGS. 8A and 8B are schematic depictions of a laser system consistent with a tenth embodiment of the invention.

FIGS. 9B-9D are diagrams used to explain operation of a range finder useful in the imaging system of FIG. 9A.

DETAILED DESCRIPTION

Figure 1A:
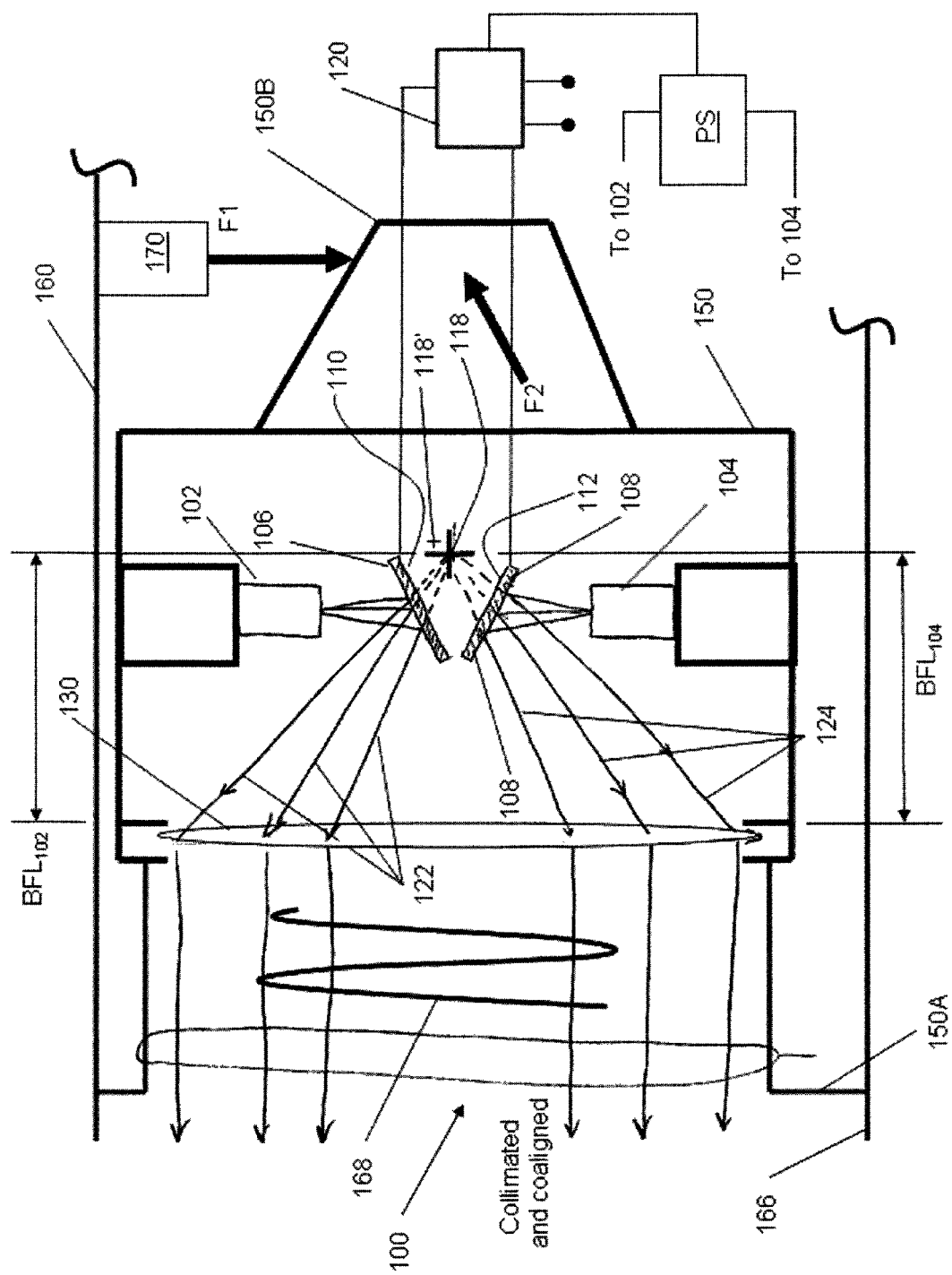
FIG. 1A is a schematic depiction of a laser sighting device consistent with a first embodiment of the invention.

Numerous embodiments are disclosed to facilitate key functions of military equipment with optical functionality. Specifically, both the manual and automatic adjustment of focus, coalignment, boresighting are addressed. Optical components requiring these adjustments include but are not limited to aim lights having collimated or near collimated light to mark a point, illumination lights having diverging light to illuminate an area, rangefinder transmitter and receiver components used in measuring range to a target, and imaging optics used to observe or record an image of the scene.

Coalignment of two or more aim lights can occur as a manufacturing step to provide the device user a well coaligned optical device, or in the field to compensate for factors such as misalignment over time or compensations for range to target. Illumination lights are typically used to illuminate the area surrounding an aim light or the area visible by imaging optics and often incorporate focus adjustment mechanisms to alter their divergence. Rangefinders are used to determine range to a target, typically marked by an aim light. Imaging optics can be used to magnify, capture, or enhance (e.g. night vision or thermal imaging) a scene which may be lit by an illumination light and which may include a target marked by an aim light.

Arranging an optical system to produce two or more overlapping or collinear focal points is disclosed. One embodiment uses reflective or refractive optical components to make the focal points of all collimated devices in the system appear to have the same virtual focal point (the location of the focal point if all reflective (e.g. mirror) folds are removed). In another embodiment, all coaligned devices have collinear virtual focal points, where the separation between the different focal points reflects the different divergences of the optical components and chromatic effects. Reflective optical components can be opaque mirrors which direct the light from multiple optical channels to share common optical components. Alternatively, selective reflectors (e.g. wavelength sensitive dichroic reflectors) can be used to overlap light from multiple optical channels onto a collinear path. Alternatively, a refractive optical device (e.g. a strong prism) can be used to overlap or coalign the light from multiple optical channels.

The reflective or refractive optical components used to modify the direction of light from the different optical channels can be individually controllable (e.g. by individual actuators), be combined into multi-surface optical devices (e.g. a prism with several reflective surfaces) employed by a number of optical channels such that they are adjusted together, or some combination of techniques (e.g. coaligning one optical channel by means of an adjustable mirror to another optical path that passes through an optical system without its direction being modified).

Implementing an array or symmetric pattern of adjacent light emitting/receiving devices is also disclosed. Rather than directing light using flat reflective or refractive surfaces with no optical power to share common optical elements which have optical power, as in other embodiment, reflective or refractive surfaces with optical power can be substituted to reduce or remove the need for shared common optical elements with optical power. Examples of optical elements with optical power may include off-axis parabolic mirrors, single-axis deformable mirrors, lens arrays, and multi-axis deformable mirrors. Pairs of single-axis deformable mirrors can be used together to create the same effect of multi-axis deformable mirrors.

Using a scanning and/or translating mirror to cycle through a number of optical devices such that they share a common aperture is also disclosed. A single optical channel can be shared by multiple components by switching between those components in a static or dynamic manner.

Figure 1B:
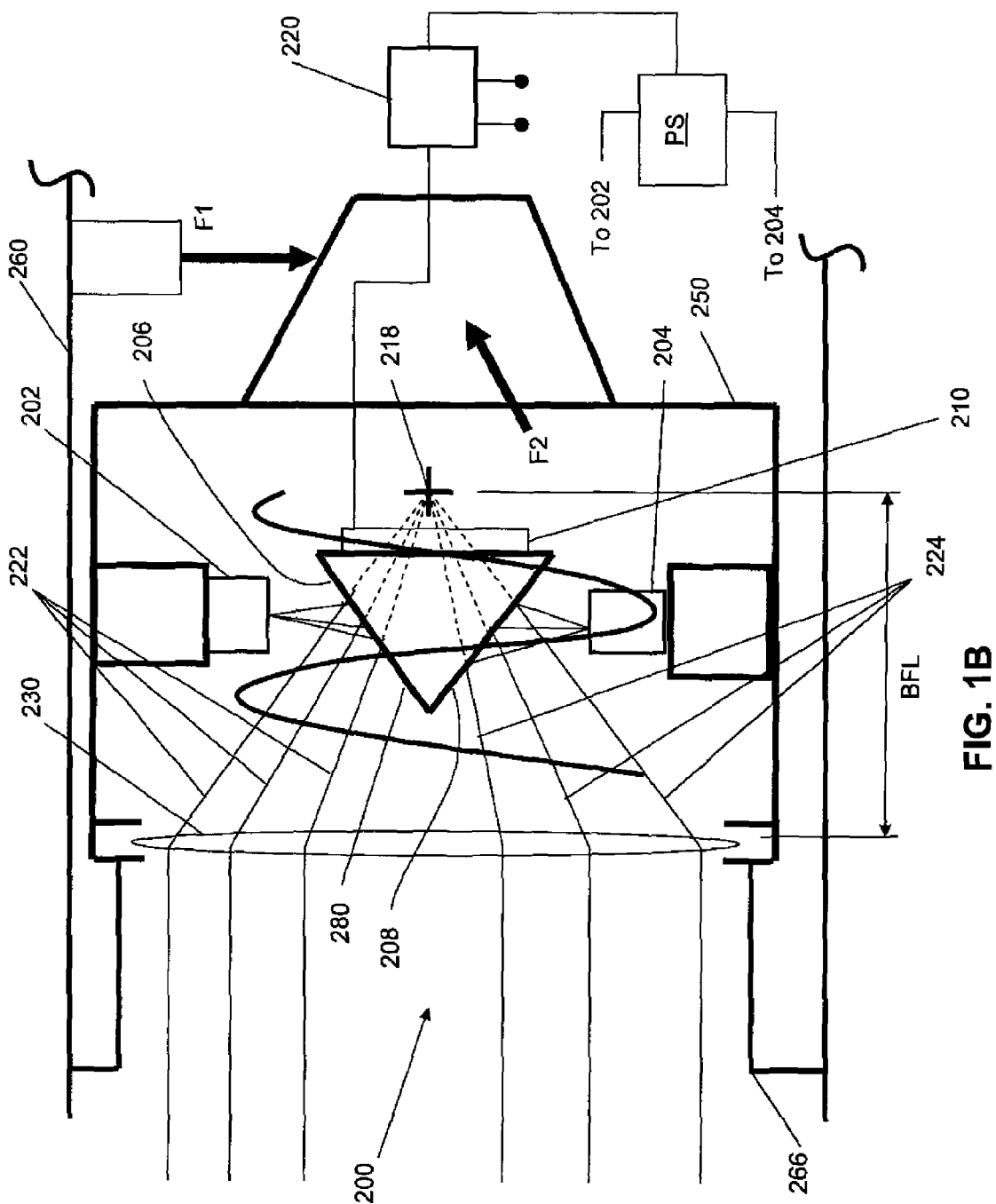
FIG. 1B is a schematic depiction of a laser sighting device consistent with a second embodiment of the invention.
Figure 1C:
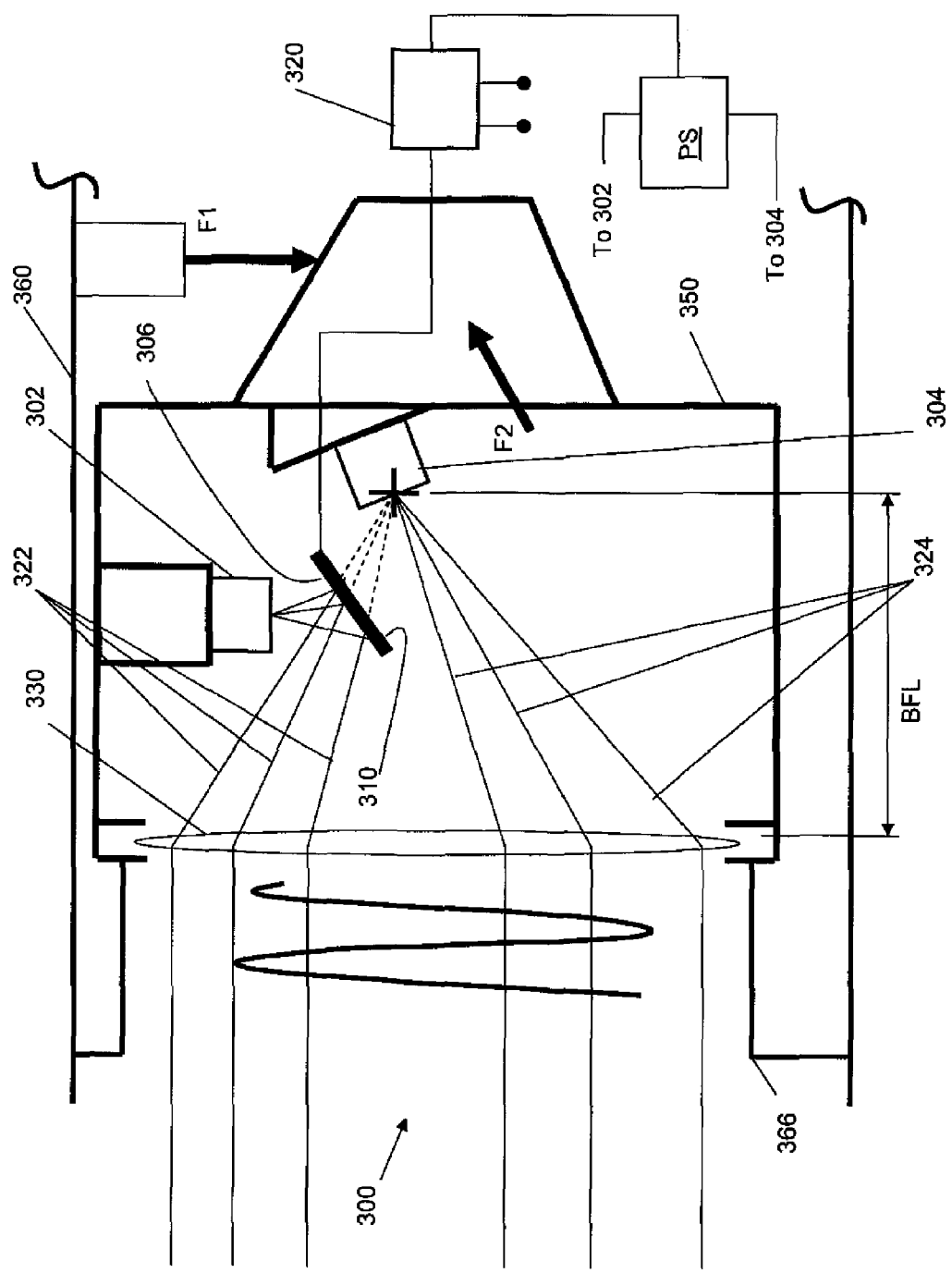
FIG. 1C is a schematic depiction of a laser sighting device consistent with a third embodiment of the invention.
Figure 1D:
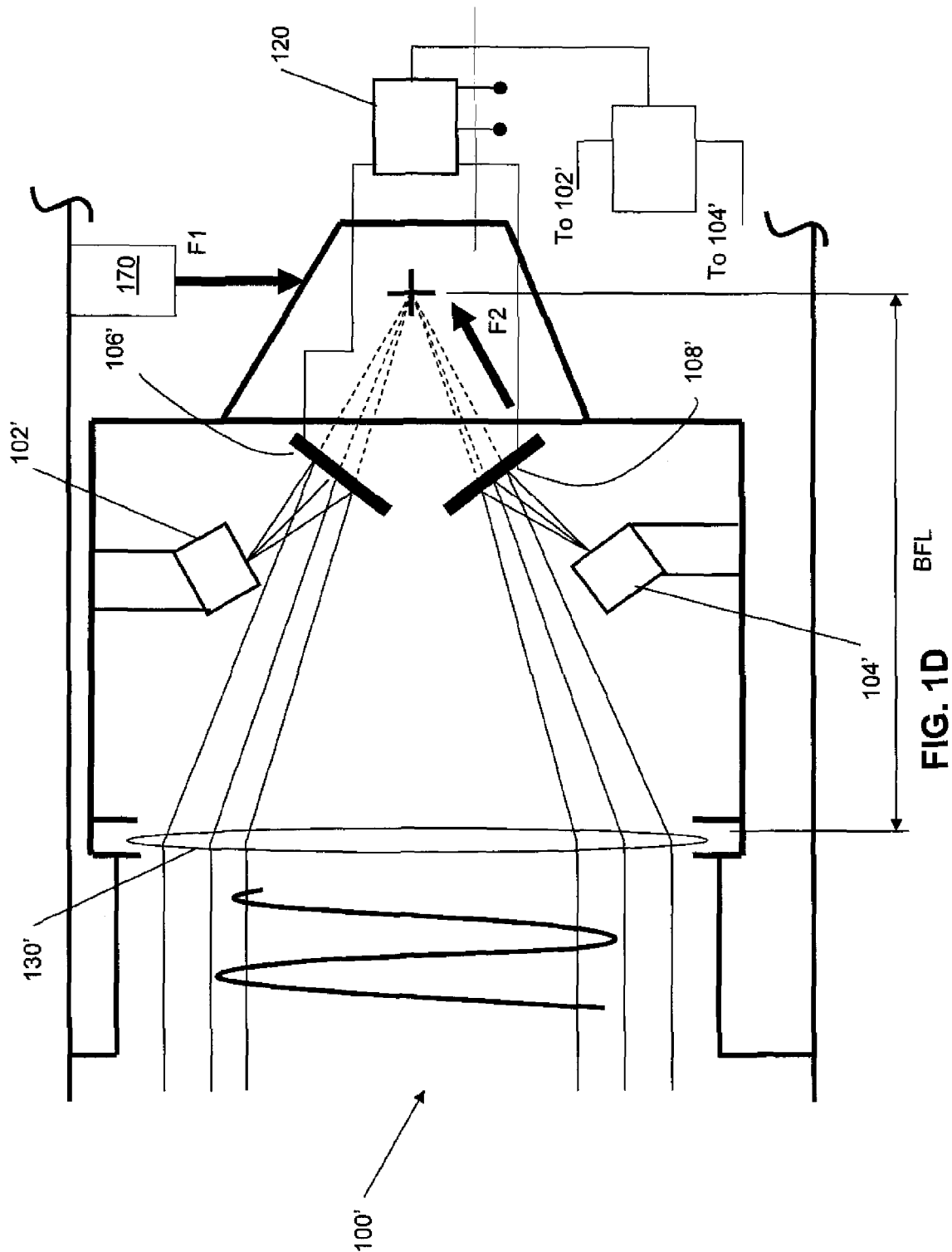
FIG. 1D is a schematic depiction of a laser sighting device consistent with a fourth embodiment of the invention.
Figure 2:
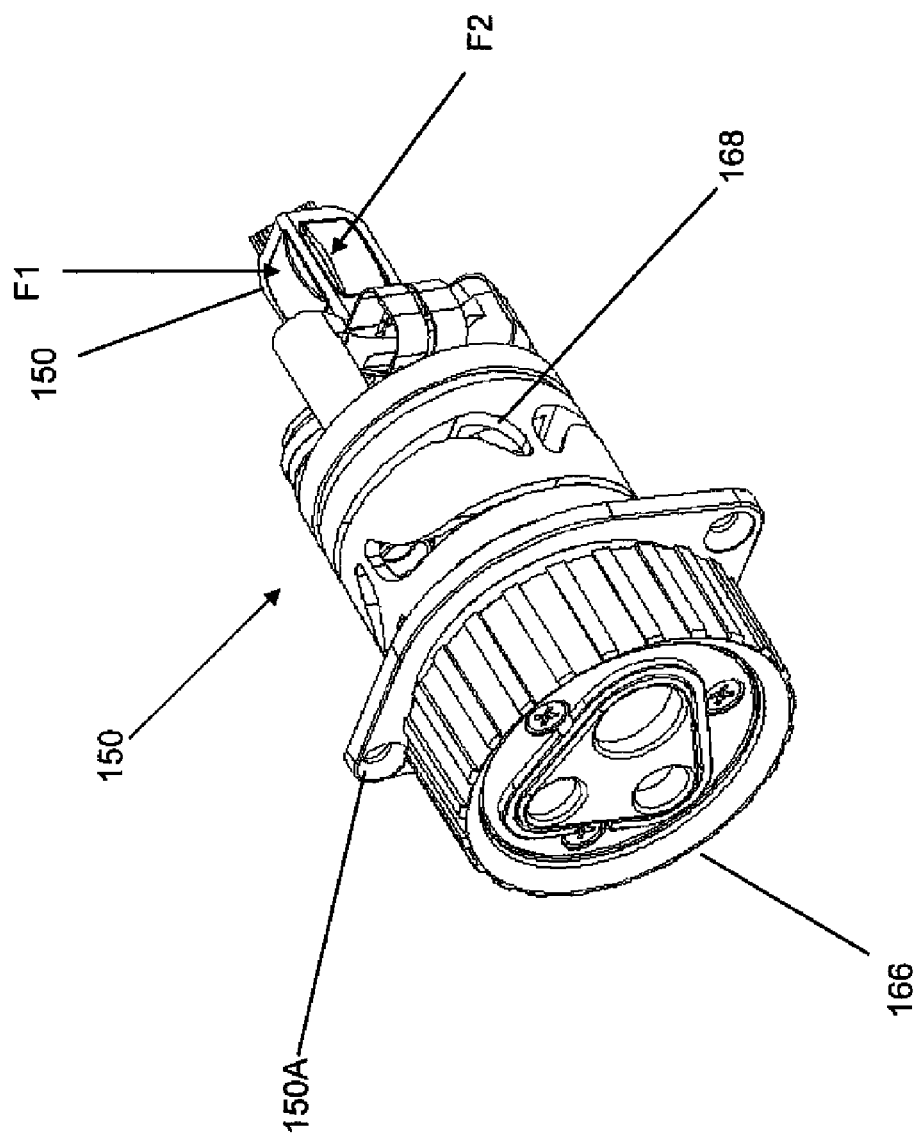
FIG. 2 is an isometric view of an optical bench structure consistent with the first embodiment of the invention.

FIG. 1A is a schematic depiction of a laser sighting device 100 and FIG. 2 is an isometric view of an optical bench 150 consistent with a first embodiment of the invention; FIG. 1B is a schematic depiction of a laser sighting device 200 consistent with a second embodiment of the invention; FIG. 1C is a schematic depiction of a laser sighting device 300 consistent with a third embodiment of the invention; and FIG. 1D is a schematic depiction of a laser sighting device 100' consistent with a fourth embodiment of the invention. Each of these embodiments may have a first laser having a virtual point that overlaps with an actual or virtual point from a second or a third laser. Alternatively, a first virtual point from the first laser may be located a first distance from a rear surface of a collimating lens equal to a back focal length appropriate for the wavelength of the first light beam and a second actual or virtual point from the second laser may be located a second distance from the rear surface of the collimating lens equal to a back focal length appropriate for the wavelength of the second light beam. These embodiments may be incorporated into a laser emitting device such as an aim light or an illuminator or a laser receiving device such as a range finder, discussed below that accepts and analyzes aim or illumination lasers. An aim light may generate a collimated beam of visible or invisible (infrared) light and an illuminator may generate a diverging beam of visible or invisible light. The diverging beam of light may be adjustable from a wide (highly divergent) beam for use with targets that are close to a narrow (weakly divergent) beam for targets that are further away.

A first laser 102 having a first principal wavelength and a second laser 104 having a second principal wavelength may be oriented generally towards each other. Additional lasers may be added without departing from the invention. The first principal wavelength and the second principal wavelength may be the same or different. The first laser 102 may have a principal wavelength in the visible spectrum between approximately 400-750 nm, for example 635 nm and the second laser 104 may have a principal wavelength in the infrared spectrum between approximately 750-14,000 nm, for example 830 nm. The light from the first laser 102 may be reflected off of a first light reflective surface 106 and the light from the second laser 104 may be reflected off of a second light reflective surface 108. The first light reflective surface 106 may be coupled to a first controllable actuator 110 and the second light reflective surface 108 may be coupled to a second controllable actuator 112. The first and second actuators may be electrically controllable actuators, for example a micro-electro-mechanical system (MEMS). A MEMS may be an integration of mechanical elements, optical elements, sensors, actuators, and electronics on a semi-conductor, e.g., silicon substrate through microfabrication technology. While the electronics may be fabricated using integrated circuit (IC) process sequences (e.g., CMOS, Bipolar, or BICMOS processes), the micromechanical components may be fabricated using compatible "micromachining" processes that selectively etch away parts of the silicon wafer or add new structural layers to form the mechanical and electromechanical devices.

The first controllable actuator 110 may be coupled to the first reflective surface 106 to control the relative orientation of the first light reflective surface 106 to the first laser 102 and the second controllable actuator 112 may be coupled to the second reflective surface 108 to control the relative orientation of the second light reflective surface 108 to the second laser 104. The first controllable actuator 110 and the second controllable 112 may be controlled by a controller 120 which may receive inputs to control the tilt and tip of the reflective surfaces 106, 108. The lasers 102, 104, the actuators 110, 112, and the controller 120 may be powered by a power supply PS. The first and second reflective surfaces may be tipped or tilted such that the light reflecting off of the first reflective surface 106 and the second reflective surface 108 appears to be coming from a common virtual point 118 located at a distance equal to a back focal length BFL for a collimating lens 130 from a rear surface of the collimating lens 130. In this embodiment correction for the lasers having differing wavelengths may be made by having separate collimating lenses or by using an achromatic doublet.

Alternatively, correction for the lasers having differing wavelengths may be made by locating the first and second lasers 102, 104 such that a first virtual point from the first laser 102 is located a first distance from a rear surface of the collimating lens 130 equal to a back focal length $BFL_{102}$ appropriate for the wavelength of the first light beam 122 and a second virtual point from the second laser 104 is located a second distance from the rear surface of the collimating lens 130 equal to a back focal length $BFL_{104}$ appropriate for the wavelength of the second light beam 124. The first and second reflective surfaces may be planar as shown, or non planar as to be discussed below.

Light 122, 124 from the first and second reflective surfaces 106, 108 then may travel through the collimating lens 130 such that the light on the other side of the lens 130 is both collimated and coaligned. Alternatively, the collimating lens 130 may be moved relative to the reflective surface to cause the light beams to diverge. The light rays may then exit through a common aperture 166 in a housing 160.

Coaligned is intended to mean that the two light beams (e.g. visible and infrared) are generally parallel, collimated is intended to mean that the light does not generally diverge, i.e. it has a focus at infinity or some very distance point, and collinear is intended to mean the light overlaps generally in a common straight line.

The first laser 102, the second laser 104, the first controllable actuator 110, the second controllable actuator 112, and the lens 130 may be coupled to the optical bench 150, all of which may at least be partially enclosed within the housing 160. A first end 150A of the optical bench 150 may be coupled directly to the housing 160 and a second end 150B of the optical bench 150 may be coupled to the housing 160 through a plurality of mechanical or electrical adjustors 170 to steer the collimated and coaligned light beams. A flexure 168 may couple the first end 150A of the optical bench 150 to the second end 150B. The adjustors 170 may apply a force F1, F2 to the tail end 150B of the optical bench 150 to steer the second end 150B relative to the housing 160 to allow the laser sighting device 100 to be boresighted to a weapon.

Figure 3:
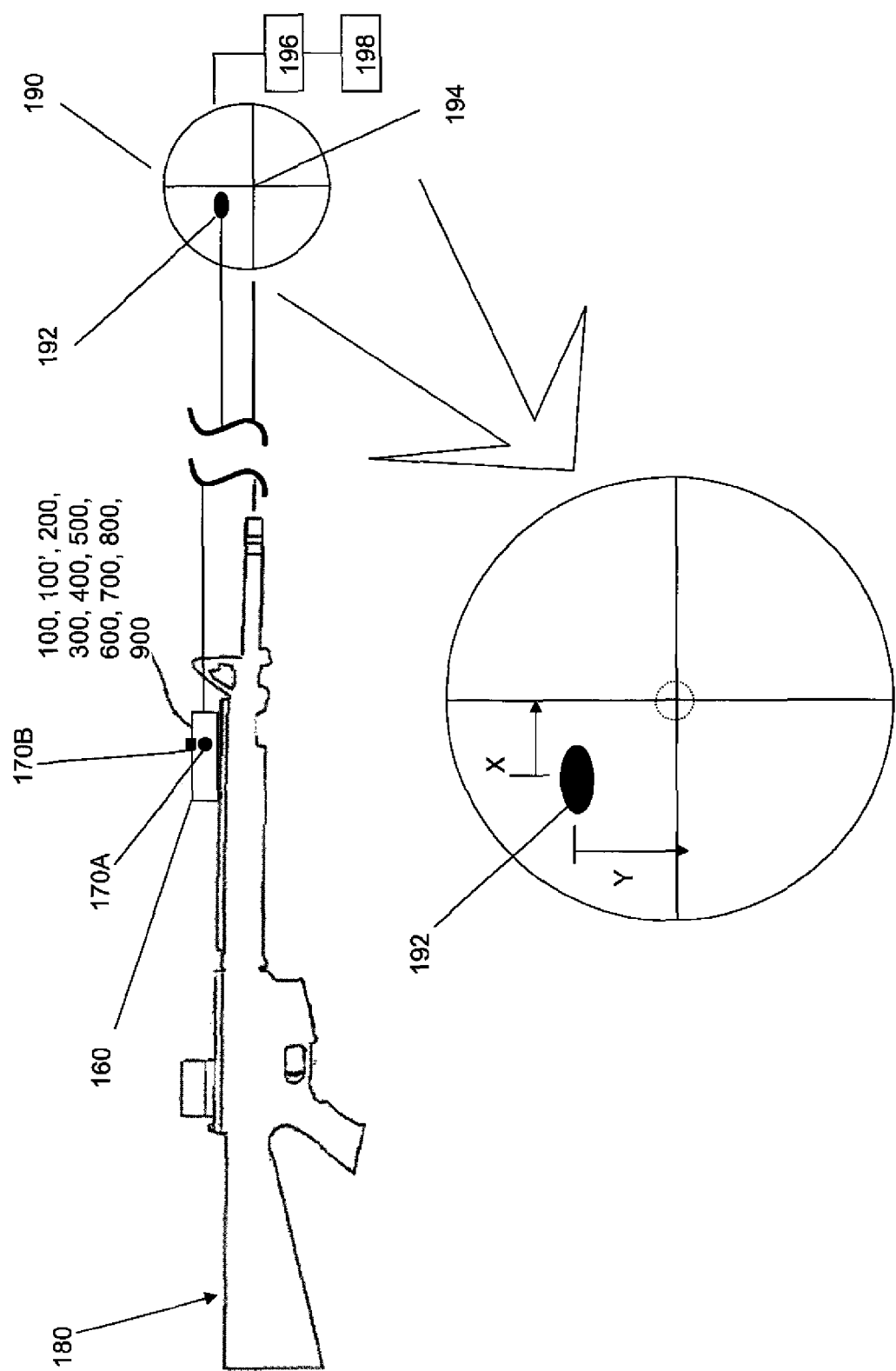
FIG. 3 shows a laser sighting device coupled to a weapon that is aimed at a target.

FIG. 3 shows the laser sighting device of FIG. 1A, 1B, 1C, 1D, 4, 5B, 6A, 6B, 7A, 7B, 8A, 8B, or 9A coupled to a weapon 180 that is aimed at a target 190. The adjustors may be offset 90 degrees from each other to provide elevation and windage adjustment of the coaligned and collimated light beam relative to the housing 160. Mechanical adjustors may be a first user accessible screw 170A accessible through an opening in the side of the housing 160 and a second user accessible screw 170B accessible through an opening in the top of the housing. Springs or other biasing mechanisms may be used to provide a counter force to the adjustors. Alternatively, the adjustors may be electrically controllable, for example MEMS, may be controllable by one or more switches on the outside of the housing, through a menu on a display or through a wired or wireless communications port. The housing 160 may be removable coupleable to the weapon 180 with a suitable attachment method, for example a rail grabber, slide-lock® mechanism, or other clamp.

Alternatively, the lasers, controllable actuators, light reflective surfaces, and lenses may be enclosed in a hermetically sealed laser diode type package with an output window as a discrete component or the lens may form a portion of the hermetic seal with the diode package. The diode package may then be coupled into an optical bench within the housing 160 or coupled to the housing in an integral optical bench, or embedded in the weapon frame or part thereof As shown in FIG. 3, the laser sighting device 100, 100', 200, 300, 400, 500, 600, 700, 800, 900 may coupled to the weapon 180 that is aimed at the target 190. When the collimated and coaligned light beams from the laser sighting device are pointed at the target 190, the projected dot 192 from the lasers may be offset from the target center 194 by a distance "X" in the horizontal direction and a distance "Y" in the vertical direction when the target is at known distance. The adjustors may be used to steer the coaligned and collimated light beam to be concentric with the center 194 of the target 190 to boresight the laser sighting device 100 to the weapon 180 at the selected distance.

Alternatively, the first controllable actuator 110 and the second controllable actuator 112 may be tilted or tipped by the controller 120 to form a virtual point 118' in a different position relative to the housing 160 in order to facilitate electronic boresighting of the laser sighting device 100 to the weapon 180. With electronic boresighting, the user can actuate one or more switch actuators which may be accessible on the outside of the housing, through a menu, or through a communications port to steer the exiting light beam relative to the housing.

A shooter may couple the laser sighting device 100 to the weapon 180, hold the weapon 180 so it will not move, fire a first projectile at a target at a known distance, and then manipulate the adjustors 170A, 170B or the electrically controllable actuators 110, 112 until the coaligned and collimated light beams are concentric with the hole in the target. The laser sighting device 100 is now boresighted to the weapon 180 at the known distance. The adjustors 170A, 170B or electrically controllable actuators 110, 112 may be manipulated by a user to compensate for elevation (bullet drop) at other distances and for changes in windage. The adjustors may be infinitely adjustable or may have mechanical or electronic "clicks" to adjust for windage and elevation.

The target may include a controller 198 coupled to one or more sensors 196 that can determine the "X" and "Y" offset. The controller 198 may then send signals to the electrically controllable adjustors or actuators 110, 112, to automatically electronically boresight the weapon. If the controller 120 receives distance to target information, the controller can manipulate the electrically controllable adjustors or actuators 110, 112 to compensate for bullet drop and if the controller receives wind speed information, the controller can manipulate the electrically controllable adjustors or actuators 110, 112 to compensate for windage.

As shown in FIG. 1B, the laser alignment system 200 may include a single element 280, for example a prism, with two or more light reflective surfaces 206, 208 coupled to one or more controllable actuators 210. The controllable actuator(s) 210 may control the relative orientation of the first light reflective surface 206 to a first laser 202 and the relative orientation of the second light reflective surface 208 to a second laser 204. The controllable actuator(s) 210 may be controlled by a controller 220 which may receive inputs to control the tilt, tip, and rotation (X, Y, Z) of the element 280. The first and second reflective surfaces 206, 208 may be manipulated by the controller 220 such that the light reflecting off of the first reflective surface 206 and the second reflective surface 208 appears to be coming from a common virtual point 218. The first and second reflective surfaces may be planar as shown, or non planar as to be discussed below.

The light 222, 224 from the first and second reflective surfaces 206, 208 then may travel through a collimating lens 230 such that the light on the other side of the lens 230 is both collimated and coaligned. The lens 230 may be disposed in an optical bench 250 such that the virtual point 218 is located at the back focal length BFL of the lens 230. The light rays may then exit through a common aperture 266 in a housing 260. In this embodiment correction for the lasers having differing wavelengths may be made by having separate collimating lenses or by using an achromatic doublet. Alternatively, correction for the lasers having differing wavelengths may be made by locating the first and second lasers 202, 204 such that a first virtual point from the first laser 202 is located a first distance from a rear surface of the collimating lens 230 equal to a back focal length BFL appropriate for the wavelength of the first light beam 222 and a second virtual point from the second laser 204 is located a second distance from the rear surface of the collimating lens 230 equal to a back focal length BFL appropriate for the wavelength of the second light beam 224. The first and second reflective surfaces may be planar as shown, or non planar as to be discussed below.

As shown in FIG. 1C, the laser alignment system 300 may include a single controllable actuator 310 coupled to a first reflective surface 306 to control the relative orientation of the first light reflective surface 306 to a first laser 302. The first controllable actuator 310 may be controlled by a controller 320 which may receive inputs to control the tilt and tip of the first reflective surface 306 such that the light reflecting off of the first reflective surface 306 appears to be coming from the emitting surface of a second laser 304. The first reflective surface may be planar as shown, or non planar as to be discussed below.

Light 322, 324 from the first reflective surfaces 306 and the second laser 304 then may travel through a collimating lens 330 such that the light on the other side of the lens 330 is both collimated and coaligned. The lens 330 may be disposed in an optical bench 350 such that the point light source is located at the focal length F of the lens 330. The light rays may then exit through a common aperture 366 in a housing 360. In this embodiment correction for the lasers having differing wavelengths may be made by having separate collimating lenses or by using an achromatic doublet. Alternatively, correction for the lasers having differing wavelengths may be made by locating the first and second lasers 302, 304 such that a first virtual point from the first laser 302 is located a first distance from a rear surface of the collimating lens 330 equal to a back focal length BFL appropriate for the wavelength of the first light beam 322 and a second virtual point from the second laser 304 is located a second distance from the rear surface of the collimating lens 330 equal to a back focal length BFL appropriate for the wavelength of the second light beam 324. The first and second reflective surfaces may be planar as shown, or non planar as to be discussed below.

As shown in FIG. 1D, the laser alignment system 100' may be similar to the laser alignment system 100 shown in FIG. 1A, but the laser 102' and 104' may not be oriented generally towards each other and they may be located closer to or further away from the collimating lens 130' than the reflective surfaces 106' and 108'.

Figure 4:
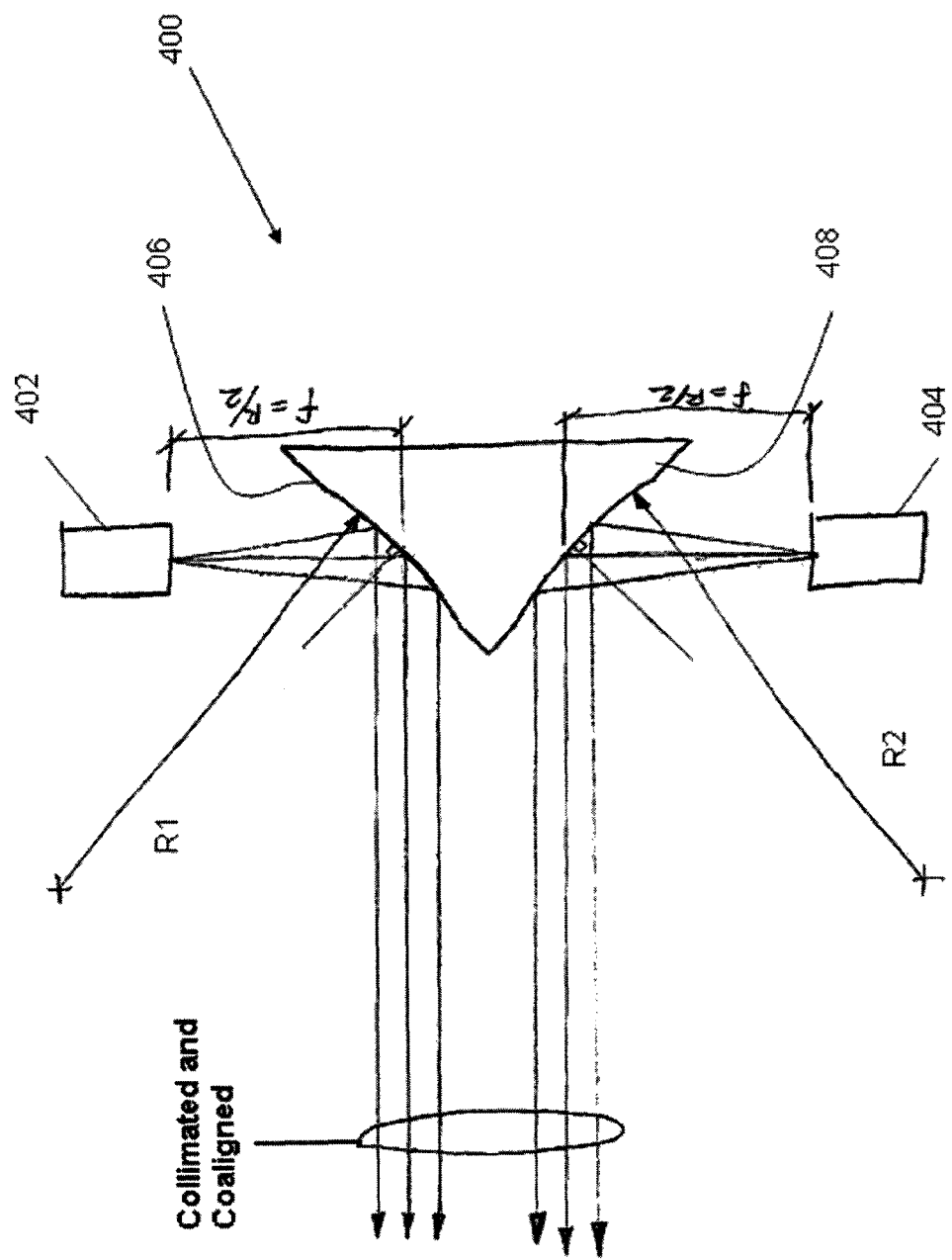
FIG. 4 is a schematic depiction of a laser alignment system consistent with a fifth embodiment of the invention.

FIG. 4 is a schematic depiction of a laser alignment system 400 consistent with a fifth embodiment of the invention. The reflective surfaces described above have been described as being planer. A contoured reflective surface may also be utilized to either generate a wider beam of illumination of fixed divergence for general illumination of an area of interest or to collimate the laser beam. This way a single sighting device with two or more lasers can be used to aim (narrow beam) and/or illuminate (wider beam) a target of interest. A first radiused reflective surface 406 and a second radiused reflective surface 408 having a radius $R_1$, $R_2$ (which may be the same or different) with a first laser 402 disposed a distance $R_1/2$ from the first reflective surface 406 and a second laser 404 disposed a distance $R_2/2$ from the second reflective surface 408. The lasers 402, 404 and the reflective surfaces 406, 408 may be housed in an optical bench as described in FIG. 1A. The first and the second radiused reflecting surfaces may not be axially symmetric which can be used to compensate for lasers with astigmatism. Parabolic or off-axis parabolic mirrors may be use to collimate light. In this design, the shape of the reflective surfaces may be customized so that no collimating lens is required.

Figure 5A:
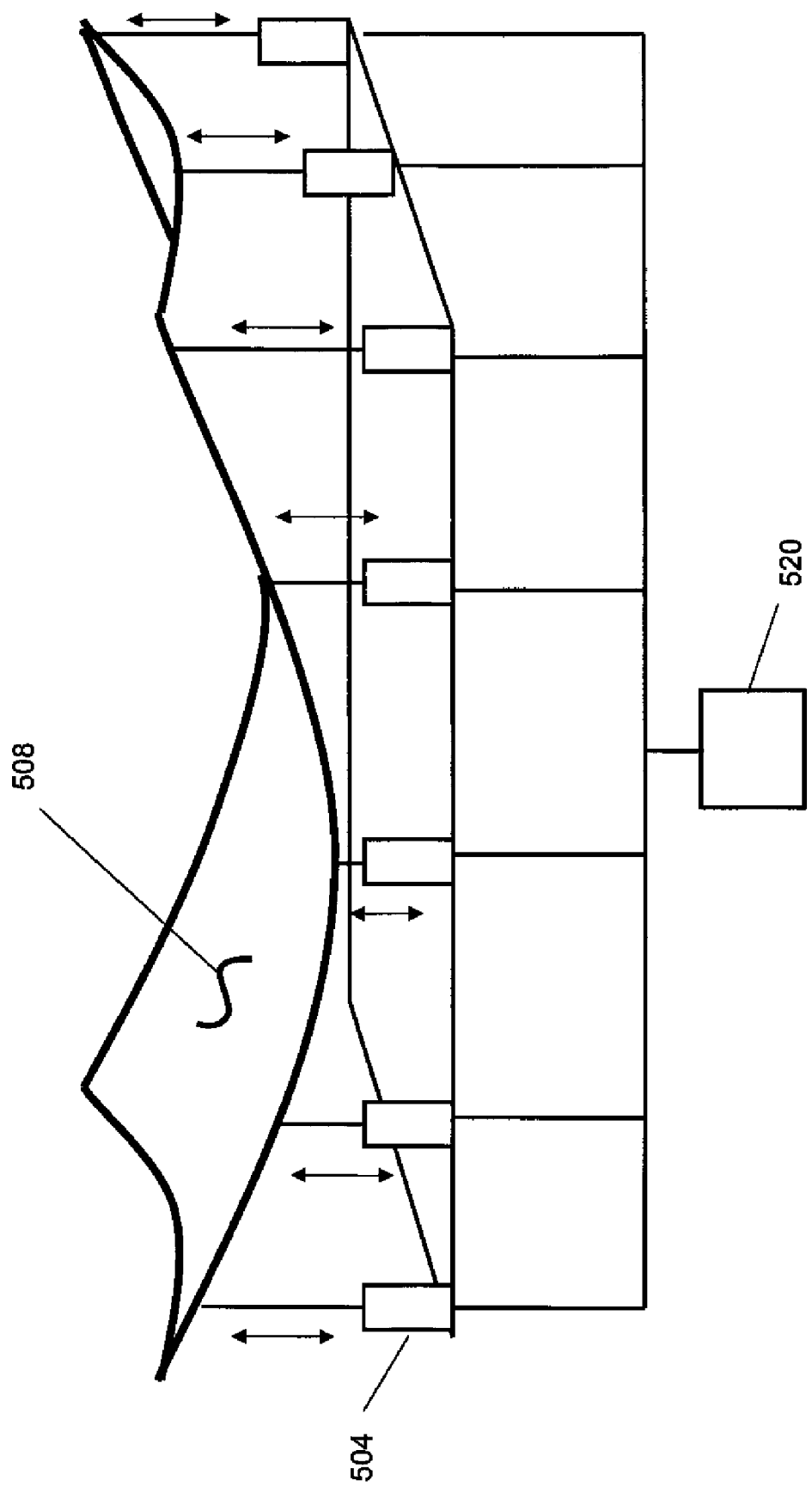
FIG. 5A is a schematic depiction of a two-axis deformable reflective surface consistent with a sixth embodiment of the invention.

FIG. 5A is a schematic depiction of a two-axis deformable reflective surface 508 consistent with a sixth embodiment of the invention. The deformable reflective surface, also referred to as an adaptive optics mirror, may be useable in conjunction with or as a replacement for any of the fixed plano or fixed contoured reflective surfaces identified above. One or more actuators 510 coupled to the reflective surface 508 can be manipulated to change the shape of the reflective surface in one or more axis to allow the shape of the beam to be changed. For example, by reshaping the reflective surface, the beam can be changed from narrow to wide, the non symmetry of the beam can be corrected, or the beam shape can be changed to a unique shape to distinguish one soldier's beam from another's. The actuator may be MEMS that are controlled by a coupled controller 520. Having a deformable reflective surface may add flexibility to the laser sighting device without duplication of parts or increased volume.

Figure 5B:
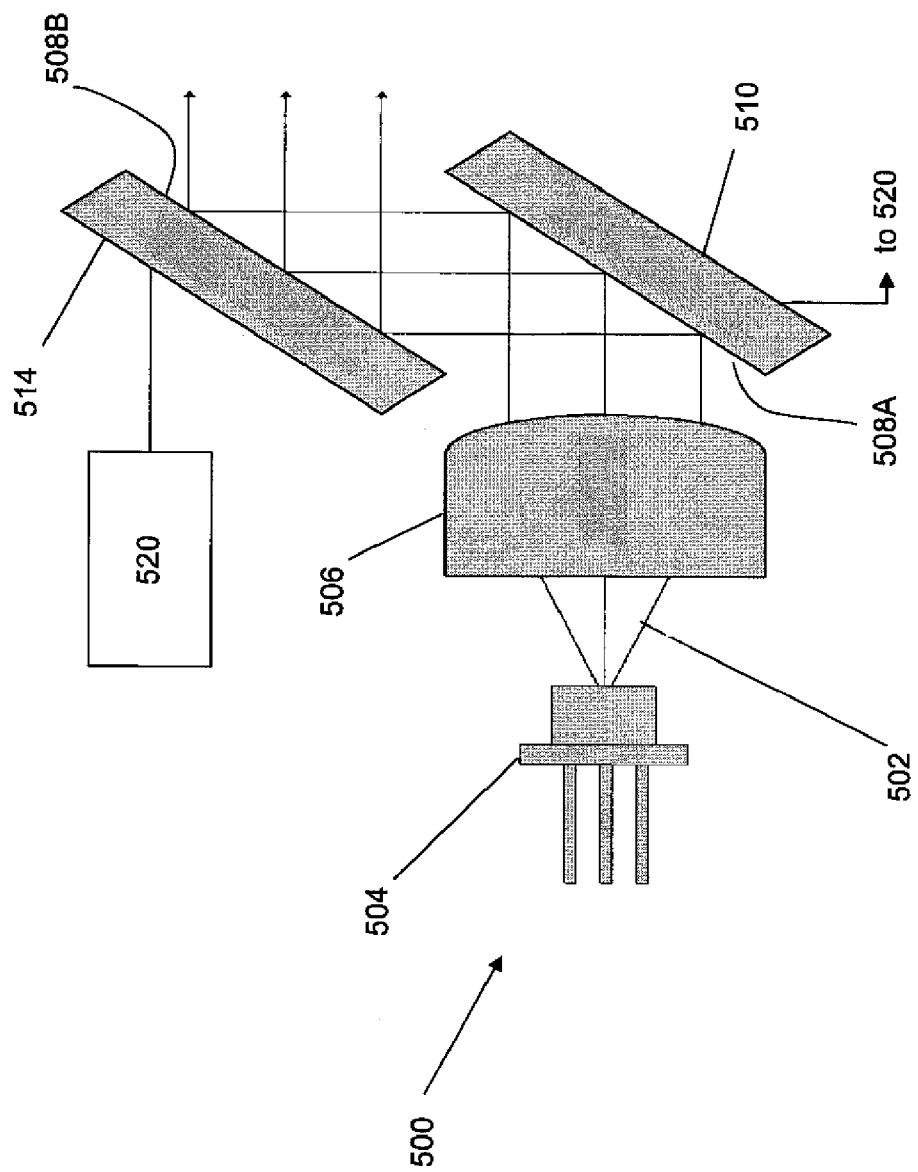
FIG. 5B is a schematic depiction of a laser alignment system consistent with a seventh embodiment of the invention.

FIG. 5B is a schematic depiction of a laser alignment system 500 consistent with a seventh embodiment of the invention. Light 502 may exit a laser 504 and strike a collimating lens 506. The light may then strike a first deformable light reflective surface 508A on a first electrically controllable actuator 510, for example a MEMS and then strike a second deformable light reflective surface 508B on a second electrically controllable actuator 514, for example a MEMS. The first and second actuators may be controlled by a controller 520. As shown in FIG. 5C, when a first voltage $V_1$ is applied, the light reflective surface 508A, 508B may be planar. As shown in FIG. 5D, when a second voltage $V_2$ is applied, the light reflective surface 508A, 5085B may have a small amount of ripple. As shown in FIG. 5E, when a third voltage $V_3$ is applied, the light reflective surface 508A, 508B may have more ripple.

Figure 5F:
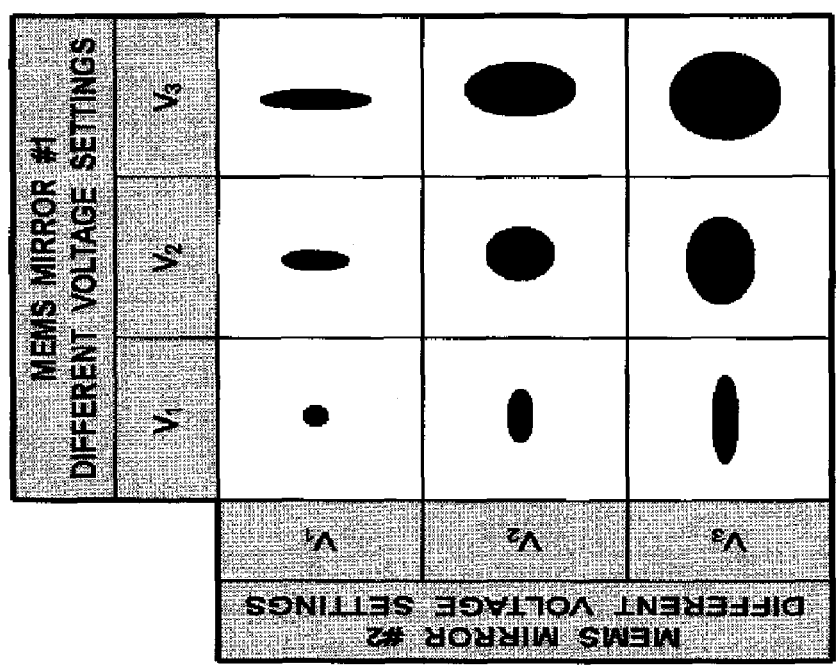
FIG. 5F is a chart showing possible beam shapes from the laser alignment system of FIG. 5B.

The controller 520 may independently control the first actuator 510 and the second actuator 514 to generate a variety of beam shapes as shown in FIG. 5F. The deformability of the reflective surface may allow one or more laser to be focused without a collimating lens and systems not having a collimating lens may not require chromatic correction.

FIGS. 6A and 6B are schematic representations of a laser alignment system 600 consistent with an eighth embodiment of the invention. An electrically controllable actuator, for example a MEMS may be utilized to generate collimated, coaligned, and collinear light beams from two different laser light sources. A first laser 602 having a first principal wavelength and a second laser 604 having a second principal wavelength may be oriented generally towards a light reflective surface 606. The first principal wavelength and the second principal wavelength may be the same or different. The first laser 602 may have a principal wavelength in the visible spectrum between approximately 400-750 nm, for example 635 nm and the second laser 604 may have a principal wavelength in the infrared spectrum between approximately 750-14,000 nm, for example 830 nm.

The light from the first and second lasers may be reflected off of the light reflective surface 606. The first light reflective surface 606 may be coupled to a controllable actuator 610 that may be controlled by a controller 620. The controller 620 may be capable of tilting the light reflective surface 606 between a first position (shown in FIG. 6A) and a second position (shown in FIG. 6B). When the first laser 602 is on, the light reflective surface 606 may be in the first position and when the second laser 604 is on, the light reflective surface 606 may be in the second position. The lasers 602, 604 and the light reflective surface 606 may be arranged such that when the first laser 602 is on and the light reflective surface 606 is in the first position the light appears to be coming from a virtual point 618 and when the second laser 604 is on and the light reflective surface 606 is in the second position the light appears to be coming from the same virtual point 618.

After light 622 from the first laser 602 and light 624 from the second laser 604 reflect off of the light reflective surface 606, they may travel through a collimating lens 630. The collimating lens 630 may be located a distance equal to the back focal length of the collimating lens 630 from the virtual point 618. Light 622' exiting the collimating lens 630 is now generally coaligned, collimated, and collinear with light 624' exiting the collimating lens 630. An achromatic lens can be used to correct for any chromatic focal shift caused by the light being refracted by the collimating lens 630 or a doublet collimating lens may be used.

Alternatively, correction for the lasers having differing wavelengths may be made by locating the first and second lasers 602, 604 such that a first virtual point from the first laser 602 is located a first distance from a rear surface of the collimating lens 630 equal to a back focal length BFL appropriate for the wavelength of the first light beam 622 and a second virtual point from the second laser 604 is located a second distance from the rear surface of the collimating lens 630 equal to a back focal length BFL appropriate for the wavelength of the second light beam 624.

Figures 7A, 7B:
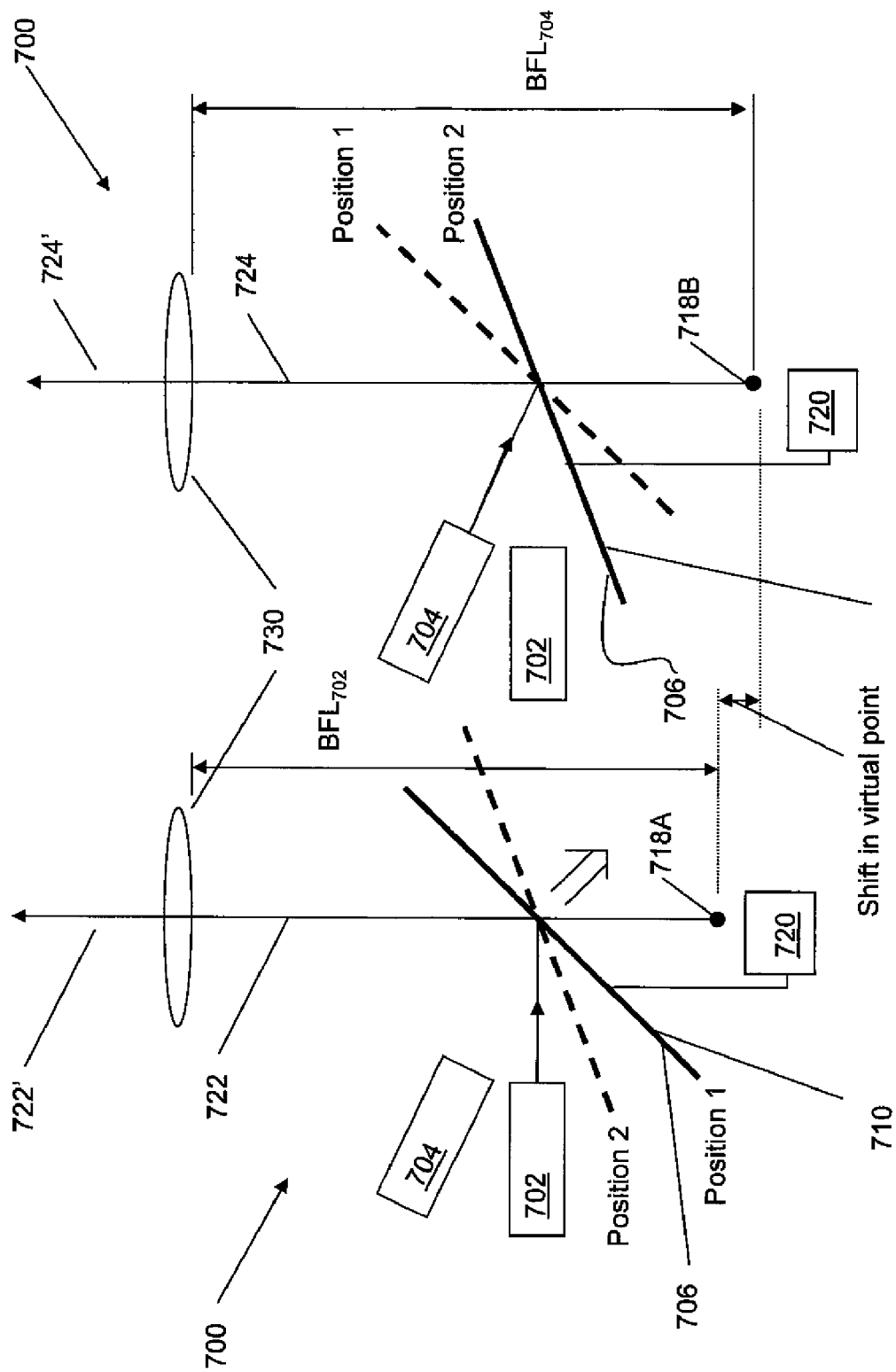
FIGS. 7A and 7B are schematic depiction of a laser system consistent with a ninth embodiment of the invention.

FIGS. 7A and 7B show a laser alignment system 700 consistent with a ninth embodiment of the invention. In this embodiment the light reflective surface 706 may be coupled to an electrically controllable actuator 710 which may be controlled by a controller 720. The actuator 710 may be configured to both tilt and translate the light reflective surface 706. The actuator 710 may translate the light reflective surface a sufficient distance away from one of the lasers 702, 704 to correct for any chromatic focal shift caused by the light beams from the lasers 702, 704 having differing principal wavelengths. The collimating lens 730 may be spaced a distance equal to the back focal length $BFL_{702}$ from the first virtual point 718A and a distance equal to the back focal length $BFL_{704}$ from the second virtual point 718B. After light 722 from the first laser 702 and light 724 from the second laser 704 reflect off of the light reflective surface 706, they travel through the collimating lens 730. Light 722' exiting the collimating lens 730 is now generally coaligned, collimated, and collinear with light 724' exiting the collimating lens 730.

FIGS. 8A and 8B show a laser alignment system 800 consistent with a tenth embodiment of the invention. The system 800 may have a first laser 802 and a second laser 804. In this embodiment, the light reflective surface 806 may have a fixed contour, for example a radius R, and be spaced a distance R/2 away from the lasers 802, 804. The light reflective surface 806 may be coupled to an electrically controllable actuator 810 which may be controlled by a controller 820. The actuator 810 may be configured to tilt the light reflective surface 806 between the first and the second positions. The reflective surface may be contoured so that the light 822, 824 reflecting off of the light reflective surface is collimated, coaligned, and collinear without requiring a collimating lens.

Alternatively, light reflective surface 806 may be deformable (in one or more axis) instead of having a fixed contour. The surface contour may be manipulated by the electrically controllable actuator 820 to reshape or redirect the exiting light 822, 824 or increase or decrease its size.

The laser alignment systems 600, 700, 800 may be mounted in an optical bench or enclosed in a hermetically sealed laser diode type package with an output window as a discrete component or if a collimating lens is used, the lens may form a portion of the hermetic seal with the diode package. The diode package may then be coupled into an optical bench within a housing or coupled to the housing in an integral optical bench or mounted in a gun frame. As described below, any of the laser alignment system embodiments may be incorporated into a range finder to generate a collimated light beam and a returning light sensor.

As noted with reference to FIG. 1A and laser sighting device 100, any of the laser alignment systems noted above having electrically controllable adjuster(s) and/or actuator(s) may be manually boresighted to a weapon.

Further, any of the laser alignment systems noted above having an electrically controllable actuator(s) or adjustor(s) may be electrically or optically coupled to a target with a sensor to automatically electronically boresight the laser alignment system with the weapon for the chosen distance. In this boresighting system, the shooter may couple the laser sighting device to the weapon, hold the weapon so it will not move, and then fire a first projectile at a target at a known distance. A controller in the laser sighting device, using received information from the photo sensor on the vertical and horizontal distance from the point of impact to the target center, could automatically manipulate the electrically controllable actuator(s) or adjustor(s) to boresight the laser sighting device to the weapon at the known distance. This may be done at numerous known distances and stored in nonvolatile memory.

The above-identified structures have been described as being aiming and illumination devices to transmit light out of the laser sighting device. This same type of structure can also be used "in reverse" as an imaging system to receive light in through the common aperture and then steer the light to one or more sensors receptive to different wavelengths of light.

Alternatively, the laser, controllable actuator, light reflective surface, and lens may be enclosed in a hermetically sealed laser diode type package with an output window as a discrete component or the lens may form a portion of the hermetic seal with the diode package.

Figure 9A:
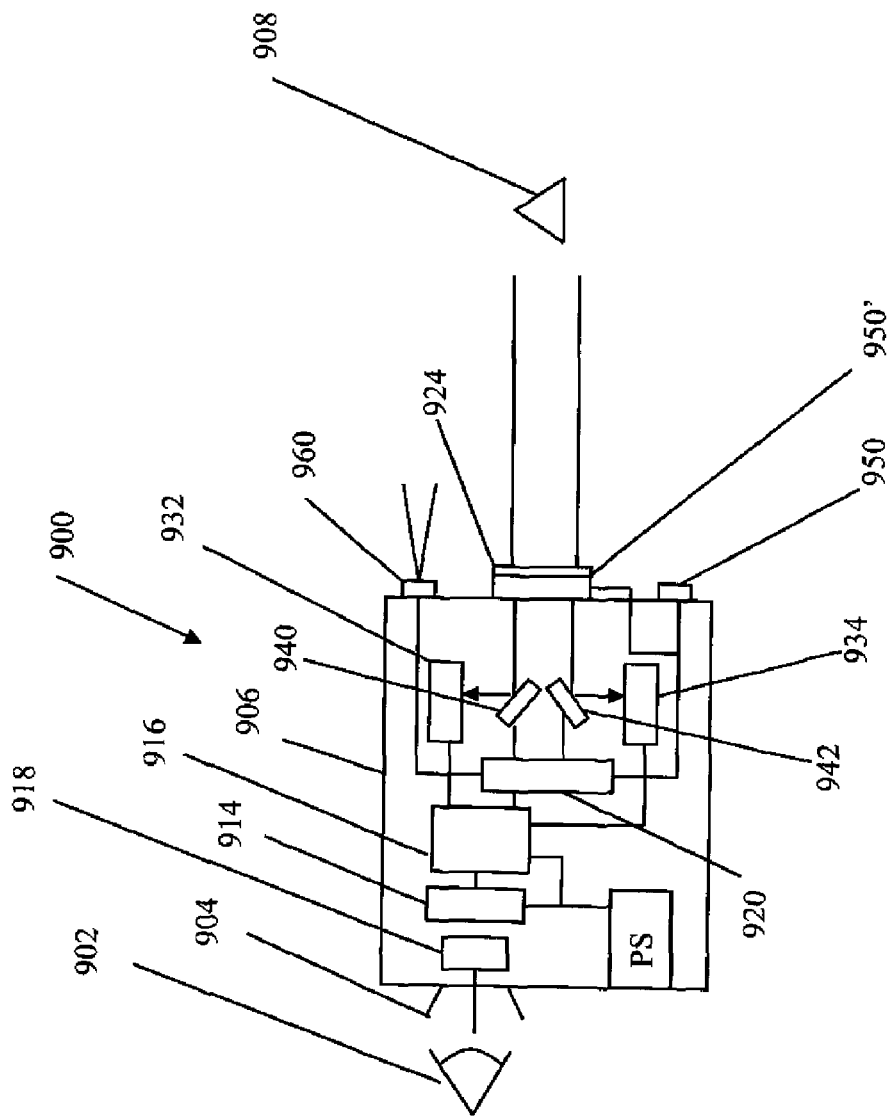
FIG. 9A is a block diagram of an imaging system consistent with an eleventh embodiment of the invention.

FIG. 9A is a block diagram of an imaging system 900 consistent with an eleventh embodiment of the invention. The imaging system 900 may have sensors 932, 934 that receive light through a common objective lens 924. Having a common aperture/objective lens helps reduce/eliminate parallax. These sensors may be receptive to light in the visible (400-750 nm) spectrum and in the infrared (750-14,000 nm) spectrum. The visible sensor may intensify the incoming image to improve viewability in low light conditions such as at night or in darkened buildings and caves. Sensor 932 may be an image intensification tube and sensor 934 may be a short, medium or long wave infrared sensor such as EBAPS, a focal plane array or microbolometer. Light, upon entering the imaging system 900, may be reflected off of a first reflective surface 940 before striking first sensor 932 or a second reflective surface 942 before striking second sensor 934. The orientations of the reflective surfaces 940, 942 may be controlled by controllable actuators coupled to a controller. An operator 902 looking through an eyecup 904 secured to a housing 906 may be able to see a target 908. Enclosed at least partially within the housing 906 may be the first sensor 932 displaced from the second sensor 934, a display 914, an image combiner/processor 916, a controller 920, and an eyepiece 918. The eyepiece 918 may have one or more ocular lenses for magnifying and focusing the combined image of the target. The output of the first sensor 932 and the second sensor 934 may be outputted to the image combiner/processor 916 and the combined image may be displayed in the display 914. Alternatively, the light entering the imaging system 900 may be split by a beam splitter before striking the first and second sensors.

The controller 920 may be coupled to an electronic 950 or a mechanical 950' range finder for determining the distance from the imaging system 900 to the target 908. The electronic range finder 950 may be a conventional laser based system that determines the distance to target based on the time it takes to send and receive a signal bounced off of the target. A mechanical range finder, as shown in FIG. 9B, may use information received from the rotational or linear position of an objective lens to determine the distance to target. As shown in FIG. 9C, the switch state of one or more switches SW1, SW2, for example switches sensitive to magnetic fields from one or more magnets 952, may be inputted into the controller 920. As the objective lens 954 is moved (rotated or translated) relative to the housing 906, the state of the switches changes. Other range finders may be used without departing from the invention. Alternatively, the user may input the distance to target information manually. U.S. Pat. No. 7,307,793, entitled Fusion Night Vision System is incorporated herein by reference in its entirety.

For example as shown in FIG. 9D, when the controller determines that the distance to target is less than 100 m, the controller may cause an illuminator 960 to generate an extra large beam (great divergence) as discussed below. As the distance to target increases, the controller may cause the illuminator to generate a smaller beam (less divergence).

The distance to target information received from the range finder 950, 950' may also be used to electronically steer the visible and/or infrared laser beam up or down relative to the housing to compensate for bullet drop by manipulating the electronically controlled actuators coupled to the reflective surfaces as noted above. For example, as shown in FIG. 9D, a weapon may be boresighted for targets between 200 and 500 m away. If the controller receives distance to target information that the target is between 100 and 200 m away, the controller may manipulate the adjustors 170A, 170B or the actuators 110, 112 to steer the beam up an angle "B" to compensate for bullet drop and if the controller receives distance to target information that the target is greater than 500 m away, the controller may manipulate the adjustors 170A, 170B or the actuators 110, 112 to steer the beam down an angle "C" to compensate for bullet drop.

By adjusting the focus ring 954 of the imaging system the operator is adjusting the field of view. The controller may be configured to match the beam width to the field of view as the target moves closer or further away.

Although reference is made to a soldier, the present invention has applications outside of military applications.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed:

1. A weapon sight, comprising:
    a housing configured to be coupled to a weapon;
    a first laser diode for producing a first light beam;
    a second laser diode for producing a second light beam;
    a collimating lens;
    a first reflective surface oriented relative to the first laser to redirect the first light beam so the first light beam appears to be coming from a first virtual point;
    a second reflective surface oriented relative to the second laser to redirect the second light beam so the second light beam appears to be coming from a second virtual point, the first and second light beams exiting the collimating lens coaligned and collimated; and
    wherein the first and second laser, the collimating lens, and the reflective surfaces are secured in an optical bench structure and a first end of the optical bench structure is coupled to the housing; and
    wherein a first adjustor and a second adjustor extend through the housing and are in contact with a second end of the optical bench structure to steer the collimated and coaligned first and second light beams relative to the housing.

2. The weapon mountable sight of claim 1, wherein the first virtual point is located a first distance from a rear surface of the collimating lens equal to a first back focal length appropriate for the wavelength of the first light beam and the second virtual point from the second laser is located a second distance from the rear surface of the collimating lens equal to a second back focal length appropriate for the wavelength of the second light beam.

3. The weapon mountable sight of claim 1, wherein the first virtual point overlaps the second virtual point.

4. The weapon mountable sight of claim 1, wherein the first and the second laser are operated simultaneously.

5. The weapon mountable sight of claim 1, wherein the collimating lens is achromatic to correct for the first and the second lasers having differing principal wavelengths.

6. The weapon mountable sight of claim 1, wherein the first light beam has a first principal wavelength and the second light beam has a second and a different principal wavelength.

7. A weapon mountable sight, comprising:
    a housing configured to be coupled to a weapon;
    a first laser diode for producing a first light beam;
    a second laser diode for producing a second light beam;
    a collimating lens;
    a first reflective surface in a first position being oriented relative to the first laser to redirect the first light beam towards the collimating lens so the first light beam appear to be coming from a first virtual point, the first reflective surface movable to a second position relative to first position and being oriented relative to the second laser to redirect the second light beam towards the collimating lens so the second light beam appear to be coming from the first virtual point, the first and second light beams exiting the housing coaligned and collimated; and
    wherein the collimating lens is located between the first reflective surface and an exit of the housing, wherein the first reflective surface is reshapable, wherein light from a first portion of the first reflective surface redirects the first light beam towards the collimating lens so the first light beam appears to be coming from the first virtual point, further comprising a second reshapable reflective surface, light reshaped in a first axis after reflecting off of the first surface is reshaped in a second axis after reflecting off of the second surface.

8. A weapon mountable sight, comprising:
    a housing configured to be coupled to a weapon;
    a first laser diode for producing a first light beam;
    a second laser diode for producing a second light beam;
    a collimating lens;
    a first reflective surface in a first position being oriented relative to the first laser to redirect the first light beam towards the collimating lens so the first light beam appear to be coming from a first virtual point, the first reflective surface movable to a second position relative to first position and being oriented relative to the second laser to redirect the second light beam towards the collimating lens so the second light beam appear to be coming from the first virtual point, the first and second light beams exiting the housing coaligned and collimated; and
    wherein the collimating lens is located between the first reflective surface and an exit of the housing, wherein the first light beam travels along a line collinear, coaligned, and collimated with the second light beam after the beams reflect off of the first reflective surface.

9. A weapon mountable sight, comprising:
    a housing configured to be coupled to a weapon;
    a first laser diode for producing a first light beam;
    a second laser diode for producing a second light beam;
    a collimating lens;

a first reflective surface in a first position being oriented relative to the first laser to redirect the first light beam towards the collimating lens so the first light beam appear to be coming from a first virtual point, the first reflective surface movable to a second position relative to first position and being oriented relative to the second laser to redirect the second light beam towards the collimating lens so the second light beam appear to be coming from the first virtual point, the first and second light beams exiting the housing coaligned and collimated; and wherein the collimating lens is located between the first reflective surface and an exit of the housing, wherein the first and the second light beams are collinear, coaligned, and collimated after the beams reflect off of the first reflective surface.

10. A weapon sight, comprising:
a housing configured to be coupled to a weapon;
a first laser diode for producing a first light beam;
a second laser diode for producing a second light beam;
a collimating lens;
a first reflective surface oriented relative to the first laser to redirect the first light beam so the first light beam appears to be coming from a first virtual point;
a second reflective surface oriented relative to the second laser to redirect the second light beam so the second light beam appears to be coming from a second virtual point, the first and second light beams exiting the collimating lens coaligned and collimated; and
wherein the first and second laser, the collimating lens, and the reflective surfaces are secured in an optical bench structure and a first end of the optical bench structure is coupled to the housing; and
wherein a first adjustor and a second adjustor and are in contact with the housing and a second end of the optical bench structure to steer the collimated and coaligned first and second light beams relative to the housing.

11. The weapon mountable sight of claim 10, wherein the first virtual point is located a first distance from a rear surface of the collimating lens equal to a first back focal length appropriate for the wavelength of the first light beam and the second virtual point from the second laser is located a second distance from the rear surface of the collimating lens equal to a second back focal length appropriate for the wavelength of the second light beam.

12. The weapon mountable sight of claim 10, wherein the first virtual point overlaps the second virtual point.

13. The weapon mountable sight of claim 10, wherein the first and the second laser are operated simultaneously.

14. The weapon mountable sight of claim 10, wherein the collimating lens is achromatic to correct for the first and the second lasers having differing principal wavelengths.

15. The weapon mountable sight of claim 10, wherein the first light beam has a first principal wavelength and the second light beam has a second and a different principal wavelength.

16. A weapon mountable sight, comprising:
a housing configured to be coupled to a weapon;
a first laser diode for producing a first light beam;
a second laser diode for producing a second light beam;
a collimating lens; and
a first reflective surface having a first portion oriented relative to the first laser to redirect the first light beam towards the collimating lens so the first light beam appear to be coming from a first virtual point, the first reflective surface having a second portion oriented relative to the second laser to redirect the second light beam towards the collimating lens so the second light beam appear to be coming from the first virtual point, the first and second light beams exiting the housing coaligned and collimated, wherein the first reflective surface is reshapable to allow the first portion to be moved relative to the second portion, further comprising a second reshapable reflective surface, light reshaped in a first axis after reflecting off of the first surface is reshaped in a second axis after reflecting off of the second surface.

17. A weapon mountable sight, comprising:
a housing configured to be coupled to a weapon;
a first laser diode for producing a first light beam;
a second laser diode for producing a second light beam;
a collimating lens;
a first reflective surface in a first position being oriented relative to the first laser to redirect the first light beam towards the collimating lens so the first light beam appear to be coming from a first virtual point, the first reflective surface in a second position being oriented relative to the second laser to redirect the second light beam towards the collimating lens so the second light beam appear to be coming from the first virtual point, the first and second light beams exiting the housing coaligned and collimated; and
wherein the first light beam travels along a line collinear with the second light beam after the beams reflect off of the first reflective surface.

18. A weapon mountable sight, comprising:
a housing configured to be coupled to a weapon;
a first laser diode for producing a first light beam;
a second laser diode for producing a second light beam;
a collimating lens;
a first reflective surface in a first position being oriented relative to the first laser to redirect the first light beam towards the collimating lens so the first light beam appear to be coming from a first virtual point, the first reflective surface in a second position being oriented relative to the second laser to redirect the second light beam towards the collimating lens so the second light beam appear to be coming from the first virtual point, the first and second light beams exiting the housing coaligned and collimated; and
wherein the first and the second light beams are collinear, coaligned, and collimated after the beams reflect off of the first reflective surface.

* * * * *